United States Patent [19]

Moats et al.

[11] Patent Number: 4,746,054
[45] Date of Patent: May 24, 1988

[54] METHOD OF JOINING CONCENTRIC CYLINDERS

[75] Inventors: Robert R. Moats, Mt. Prospect; Woodrow L. Bowen, Barrington, both of Ill.

[73] Assignee: Northrop Corporation, Hawthorne, Calif.

[21] Appl. No.: 18,327

[22] Filed: Feb. 24, 1987

Related U.S. Application Data

[63] Continuation-in-part of Ser. No. 770,892, Aug. 29, 1985, abandoned.

[51] Int. Cl.$^4$ ................... B23K 31/02; B23K 31/06
[52] U.S. Cl. ........................... 228/122; 228/124; 228/243; 29/421 R; 72/61
[58] Field of Search ............... 228/122, 124, 133, 132, 228/243; 29/421; 72/61, 62

[56] References Cited

U.S. PATENT DOCUMENTS

| | | | |
|---|---|---|---|
| 895,412 | 8/1908 | Badger | 228/132 |
| 2,570,248 | 10/1951 | Kelley | 228/121 |
| 2,779,279 | 1/1957 | Maiwurm | 29/523 |
| 3,408,728 | 11/1968 | Fickett et al. | 228/243 |
| 4,533,806 | 8/1985 | Kawasaki | 228/243 |

FOREIGN PATENT DOCUMENTS

| | | | |
|---|---|---|---|
| 2722304 | 11/1977 | Fed. Rep. of Germany | 228/243 |
| 28590 | 7/1972 | Japan | 228/122 |
| 35075 | 2/1984 | Japan | 228/122 |

*Primary Examiner*—Nicholas P. Godici
*Assistant Examiner*—Samuel M. Heinrich
*Attorney, Agent, or Firm*—Terry J. Anderson; Robert B. Block

[57] ABSTRACT

A method of forming a composite metal-ceramic helix structure suitable for TWT application. The method includes concentrically joining a metal cylinder disposed within a ceramic cylinder to form a high strength hermetic bond therebetween having good thermal conductivity. Prior to joining the cylinders a predetermined quantity of heat vaporizable liquid is disposed within the metal cylinder and its ends are sealed off. During the brazing process the liquid vaporizes ensuring intimate contact between the concentric cylinders. Thereafter the metal cylinder ends are removed and the resulting concentric structure machined into a helical shape.

15 Claims, 2 Drawing Sheets

METHOD OF JOINING CONCENTRIC CYLINDERS

CONTRACTUAL ORIGIN OF THE INVENTION

The United States Government has rights in this invention pursuant to Contract No. F33615-82-C-1757 between the U.S. Air Force and Northrop Corporation.

CROSS REFERENCE TO RELATED APPLICATION

This is a continuation-in-part of U.S. patent application Ser. No. 770,892 filed on Aug. 29, 1985, now abandoned.

BACKGROUND OF THE INVENTION

This invention relates to a method of forming a composite metal-ceramic helical structure for use in a Travelling Wave Tube (TWT) amplifier, the composite structure having good thermal conductivity and superior electrical characteristics over composite helix structures formed by conventional methods.

In a broader sense this invention also relates to a method for joining concentric cylinders and, in particular, to a method of joining an inner cylinder of relatively thin ductile metal to an outer cylinder of relatively stiff ceramic material. Thus, without restriction to the particular processes described herein for the purposes of disclosing preferred embodiments and best modes presently known for carrying out the invention, this invention relates to both a process for forming very precisely configured composite metal-ceramic helical structures and a process for forming a high strength hermetic bond with good thermal conductivity between an inner cylinder made of a ductile metal material such as copper and an outer ceramic cylinder.

TWT's are generally a type of high power, very high frequency signal amplifier providing, for example, a continuous wave signal output in the one kilowatt power range at frequencies between eight and eighteen gigahertz. An essential element common to most TWT's is a conducting metal helical structure which carries an input signal and modulates an electron beam traveling down the central bore of the helix. Physically this helix may be very small, for example, less than one-tenth of an inch in diameter and slightly over two inches in length. Generally the helix operates at relatively high temperatures on the order of five hundred degrees centigrade. Because of their small size and high operating temperatures, heat dissipation is a critical factor in the design of helix structures.

TWT helices have been conventionally configured as an all-metal helical structure, such as copper, supported on several sides by a number of non-conducting dielectric rods extending along the length of the metal helix and attached to the outside of this metal structure. While rod supported all-metal helices usually provide satisfactory electrical characteristics (e.g. low RF signal attenuation and acceptable dielectric loading), these configurations typically have poor thermal characteristics. The minimal contact between the turns of the metal helix and the dielectric rods provides only a limited path for heat dissipation, with the result that portions of each turn making up the metal helix may develop localized hot spots at temperatures high enough to melt the metal.

Another TWT helix configuration which has been attempted in the past is a composite metal-ceramic structure in which a ceramic helix is bonded to a metal helix along the entire outer surface of the metal structure. This composite metal-ceramic helix type configuration is obtained by first wrapping a metal ribbon about a mandrel to form the metal helix, wrapping one or more covering tapes about the metal helix so as to bridge the gaps between each of the turns of the metal helix, and then depositing a ceramic compound onto the exposed outer surface of the metal helix by sputtering or plasma deposition techniques. Excess ceramic and the spacer tapes are then removed by etching. Thereafter, the outer surface of the deposited ceramic is machined to obtain requisite outer dimensions and tolerances. Composite TWT helical structures formed by ceramic deposition processes typically possess good thermal transfer properties but also display a number of unacceptably poor electrical characteristics such as, for example, very high RF losses. In addition, the fabrication process is very difficult and expensive to implement. It is typically difficult to accurately register the pitch of the covering tapes with the pitch of the metal helix and some of the final processing steps such as the etching and machining steps are difficult to properly carry out.

Thus there exists a need for a method of producing metal-composite helices for TWT applications which is simpler and less expensive to practice, and which provides a resulting metal-ceramic helix structure having improved electrical characteristics. As discussed more fully in the Summary and Detailed Description below, Applicants have achieved a novel and unique process for forming composite metal-ceramic helix for TWT applications by first concentrically joining a metal cylinder to a ceramic cylinder and then machining the joined cylinders into a helical structure.

Various attempts have been made to develop a satisfactory process which will bond a metallic material such as copper to the inner surface of a non-metallic material such as a ceramic, carbon or diamond to form a high strength bond with good thermal conductivity which is free from any air-pockets or occlusions in the area between the metal and the non-metallic material. One method attempted in the prior art is disclosed in U.S. Pat. No. 2,570,248 "METHOD OF METALIZING AND BONDING NON-METALLIC BODIES" wherein a process for joining metallic bodies to non-metallic refractory bodies utilizes a mixture including titanium hydride and a solder metal such as copper, silver, gold, or the like applied to the body to be metalized or bonded. The hydride is thereafter disassociated by the application of heat in the presence of a solder metal. This heating is preferably done in a non-oxidizing atmosphere, such as pure dry hydrogen. The coated body is heated in the inert medium to a temperature sufficient to disassociate the hydride and melt the metallic material. In another embodiment, the non-metallic part and the metal part are placed in close contact, as in a common brazing operation, and a hydride mixture, such as titanium hydride and a copper powder, is placed at or adjacent the junction of the two bodies in a pure dry hydrogen atmosphere until the hydride is disassociated and a melting of the titanium and copper results. While such a process may be satisfactory in certain instances, pockets or occlusions may occur between the metallizing or metallic material and the non-metallic body, particularly when cylindrical bodies are concentrically joined.

Another attempt to resolve this problem is disclosed in U.S. Pat. No. 2,779,279 "APPARATUS FOR SECURING A TUBE OR TUBES IN A BODY MEMBER" in which a grooved body member has a tube inserted therein. A predetermined explosive charge is placed within the tube in a position adjacent to the grooved body member and a pair of explosion confiners, in the form of spheres, are placed at either end of the explosive charge. Upon ignition of the explosive charge, the blast is directed by a momentary confinement, due to the joining together of the spheres, which prevents them from moving away from each other. In this manner the explosion expands the tube to conform to the grooves in the body member. While such a system may be satisfactory for some purposes, the conductivity of the metallic material may be non-uniform due to the inherent nature of the explosion and residual materials from the explosion may or may not remain within the confines of the body member. Thus there still exists a need for a method of concentrically joining a metal cylinder within a non-metallic or ceramic cylinder which is suitable for TWT applications.

SUMMARY OF THE INVENTION

It is therefore an object of the present invention to provide a method of forming a composite metal-ceramic helix suitable for TWT applications. It is a further object of the present invention to provide a method of forming composite metal-ceramic TWT helices which have improved electrical characteristics over composite metal-ceramic structures formed by conventional processes.

As discussed in the Background section above, these and other goals and objectives are achieved in the present inventive method by first concentrically joining a metal cylinder to a ceramic cylinder and then machining the joined cylinders into a helical shape.

Thus another object of this invention is to improve the bonding of a metallic cylinder to a non-metallic cylinder and yet a further object of this invention is to provide a high strength hermetic bond between a metallic cylinder and a non-metallic cylinder which has good thermal conductivity.

In a preferred embodiment of the present inventive method, an inner cylinder of a ductile material, such as a thin-walled oxygen-free cooper tube, is partially filled with water prior to being sealed at both ends. The metallic tube is first inserted into a ceramic tube which may have its inner surfaces coated with a brazing material, for example by electroplating. One end of the metallic tube is then sealed, and a quantity of water is placed inside prior to sealing the remaining open end. The concentrically position tubes are thereafter subjected to a brazing cycle which creates a water vapor within the cooper tube causing the cooper tube to expand significantly beyond its characteristic thermal expansion curve. The excessive expansion of the copper tube expands the tube into the intimate contact with the metallized ceramic surface. An effective bond thereby occurs between the copper tube and the ceramic tube throughout the entire length of the ceramic tube with no occlusions existing therebetween.

After concentrically bonding the metal cylinder to the ceramic cylinder, the ends of the metal cylinder are cut off and the water removed. The cylinders are then machined into a helical structure. In one presently preferred embodiment, the ceramic cylinder is first machined into a helical shape by grinding and the metal cylinder then machined into a cylindrical shape in a separate process step such as electric discharge machining.

DESCRIPTION OF THE DRAWINGS

Further objects of the intention together with additional features contributing thereto and advantages accruing therefrom will be apparent from the following description of preferred embodiments of the invention which are shown in the accompanying drawings with like reference numerals indicating corresponding parts throughout, wherein.

DESCRIPTION OF THE PREFERRED EMBODIMENTS

Figure 6:
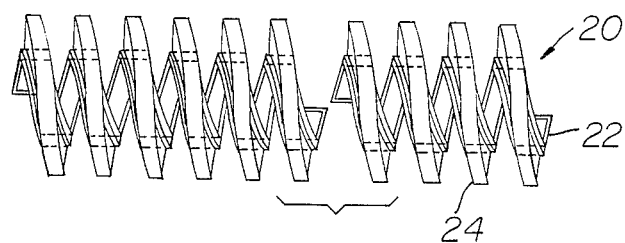
FIG. 6 is a side view of a composite metal-ceramic helix formed by the present inventive process.
Figure 7:
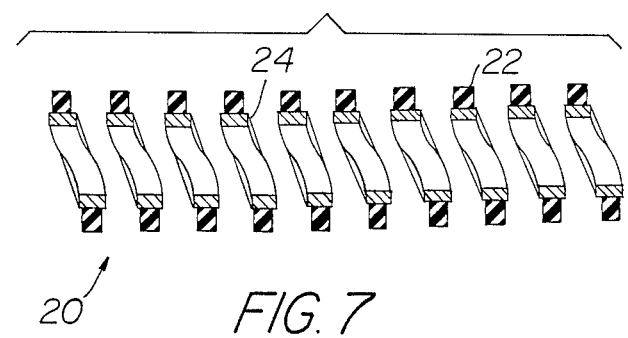
FIG. 7 is a cross sectional view of the composite helix structure shown in FIG. 6.

Referring to the drawings, and more particularly FIGS. 6 and 7 thereof, there is shown a composite metal-ceramic helix 20 formed by the present inventive process. The composite helix 20 includes an inner helix 22 made of a highly conductive metal such as oxygen free copper brazed to an outer nonconducting dielectric helix 24 made of a suitably rigid material such as a beryllium oxide ceramic. Alternative conductive metals and nonconducting ceramics or other dielectric materials may also be employed instead of copper and beryllium oxide. In one presently preferred embodiment of the composite helix 20 illustrated in FIG. 7 the width of the ceramic helix 22 is "undercut," or narrower than the width of the inner metal helix 22. This "undercutting" has been found to enhance some of the electrical characteristics, such as dielectric loading, of the composite helix 20 in TWT applications.

Figure 1:
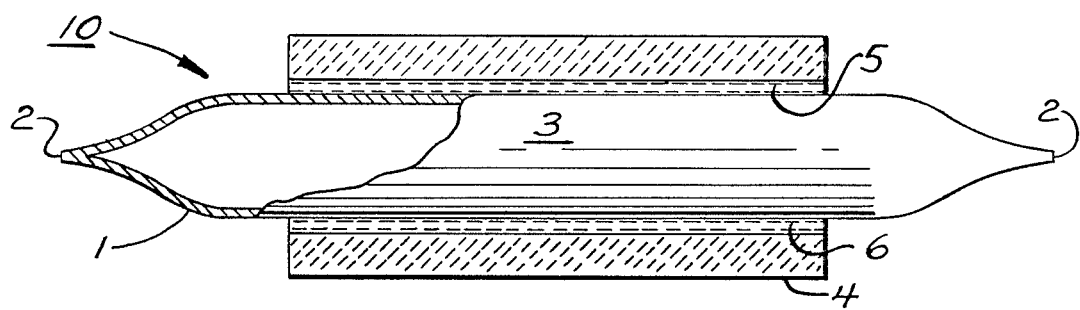
FIG. 1 is a side profile view of a metal tube prior to bonding to a ceramic cylinder with the ceramic cylinder shown in cross section and a portion of the metal tube broken away.
Figure 2:
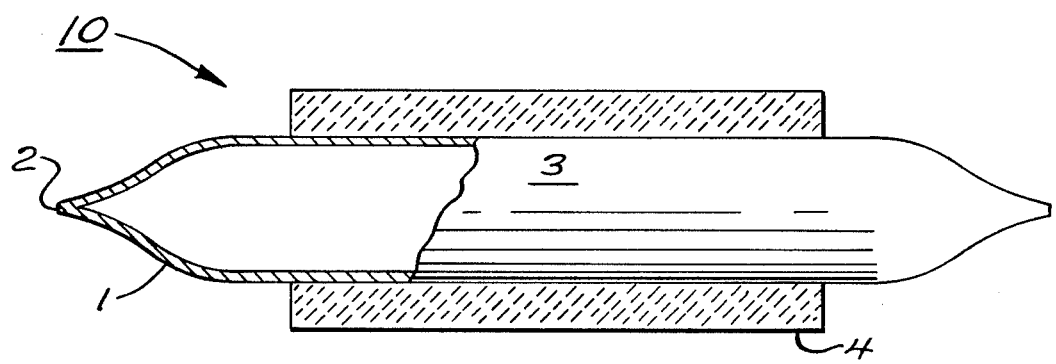
FIG. 2 is a side view of the concentric cylinders shown in FIG. 1 after bonding of the metal inner tube to the outer ceramic cylinder.
Figure 3:
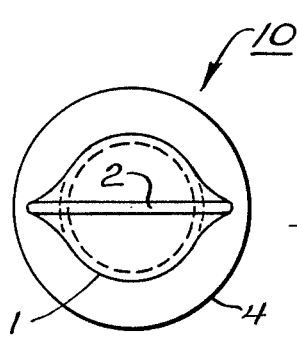
FIG. 3 is an end view of the cylinder shown in FIG. 2.

As previously discussed, the helical structure 20 is formed by first concentrically joining a metal cylinder within a ceramic cylinder. Referring now to FIGS. 1, 2 and 3, there is shown a metal-bonded ceramic cylinder 10 formed through a first embodiment of the present inventive cylinder joining method. This first embodiment utilizes an inner cylinder 1 of relatively thin-walled ductile metal material capable of being hermetically sealed at each end 2, such as a thin-walled oxygen-free copper tube. An outer cylinder 4 is preferably formed from ceramic material such as, for example, beryllium oxide and either by its geometry or its material character is relatively stiff in comparison to the inner metal cylinder. 1. While a circular metal cylinder is preferred, metal cylinders having other cross-section shapes can also be utilized.

The inner surface 5 of the outer ceramic cylinder 4 is metallized by a conventional moly-manganese process (such as described in W. H. Kohl, *Handbook of Materials and Techniques for Vacuum Devices,* Reinhold Publishing Corp., New York, N.Y., 1967, page 446 ff). This process involves a metallizing compound which is initially in a liquid solution that can be conveniently applied to the inner surface 5 of the ceramic cylinder 4. The metallized ceramic surface may then be nickel plated and the outer surface 3 of the copper tubing 1 preferably silverplated 6 to a thickness of about 0.0002 inches.

In this particular embodiment of the present inventive process, a copper tube 1 having an initial outside diameter of approximately 0.078 inches, an initial inner diameter of approximately 0.052 inches and an initial length of approximately 2.5 inches, has been used to form a TWT helix. After applying the metallizing layers the copper tubing 1 is sealed at one end and approximately four microliters of water, or other vaporizable liquid, is placed inside. The opposite end of the tube 1 is then also hermetically sealed. Preferably, the ends of the copper tube 1 are sealed by TIG welding, or by torch brazing with a silver eutectic. While cold welding did work occasionally, it was found that sealing the ends of the copper tubing 1 by cold welding, referred to as "pinch-off", was sometimes inadequate to withstand the steam pressure which is subsequently generated within the copper tube. While four microliters provided satisfactory expansion of the copper tube 1 on a generally consistent basis, quantities of water in excess of ten microliters have almost invariably caused the ends of the copper tube 1 to rupture even when the ends were welded closed.

When the ends of the silverplated copper tube 1 have been sealed and the tube 1 positioned within the metallized outer ceramic tube 4, the concentric tubes are brazed. The brazing causes the copper tube 1 to expand significantly beyond its characteristic thermal expansion curve due to the pressure of steam formed inside the inner copper cylinder 1. During the brazing cycle, the copper tube 1 experiences an internal pressure of approximately 3900 psia and expands approximately 0.005 inches beyond its initial diameter, bringing the outer surface 3 of the copper tube 1 into intimate contact with the inner metallized ceramic surface 5. A copper-silver braze was found to take place very effectively at 850 to 1000 degrees centigrade in a hydrogen atmosphere. Subsequent cross-sectioning of the brazed assembly has confirmed a good bond between the copper and ceramic over the full length of the ceramic tube without any evidence of voids or occlusions, providing concentrically joined cylinder suitably bonded to withstand subsequent machining into a helical configuration. After brazing, the sealed ends 2 of the inner copper tube 1 may be cut off to produce a metallized beryllium oxide cylinder with a high quality brazed copper fillet. The concentrically joined metal ceramic cylinders can then be machined into a helical configuration as discussed more fully below.

Figure 4:
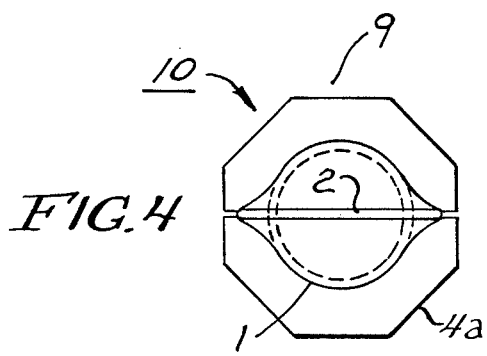
FIG. 4 is a cross sectional view of an alternative embodiment which may be utilized in forming a metal bonded ceramic cylinder.

While this embodiment was described with reference to a ceramic cylinder 4 having a closed cross-sectional configuration, it has been found that in certain applications splitting the ceramic cylinder 4 along its entire length to form two ceramic cylinder halfs 4a and 4b, as shown by the view in FIG. 4, may be preferable. While a solid cylinder 4 is more substantial as to physical properties, use of the split ceramic cylinder configuration provides easier access to the interior bore sections of the ceramic cylinder halfs 4a and 4b which permits the use of alternate metallization techniques such as sputter or evaporative coating processes. Thus in an alternative embodiment of the present inventive process the interior bore sections of a pair of split beryllium oxide ceramic cylinder halfs 4a, 4b were sputter coated with successive layers of titanium, molybdenum and copper and the outer surface 5 of the copper tube 1 was also silver plated as discussed above. The copper tube 1 and the ceramic cylinder halfs 4a, 4b were then arranged as concentric cylinders as shown in FIG. 4 and the outside of the structure wrapped in a restraining wire 9 to secure the ceramic halfs 4a, 4b during the brazing process. This wire 9 can be any suitable material such as titanium or molybdenum which retains a relatively high tensile strength at brazing temperature of between 850 and 1000 degrees centigrade and has a lower coefficient of thermal expansion than the ceramic of the cylinders 4a, 4b. Alternatively an appropriately configured restraining jig (not shown) can be used. The ends 2 of the copper tube 1 were then sealed with approximately four microliters of water entrapped within. The concentrically configured cylinder halfs 4a, 4b and copper tube 1 are then subjected to the brazing process step as discussed above. This metallization scheme was found to provide a very satisfactory bond between the ceramic halfs 4a, 4b and copper tube 1 with the molybdenum layer from the ceramic metallization step preventing diffusion of copper from the tube 1 into the ceramic 4a and 4b. Substantially the same results have also been obtained without silverplating the outer surface 5 of the copper tube 1. After brazing, the concentrically brazed cylinders were machined as discussed more fully below.

Figure 5:
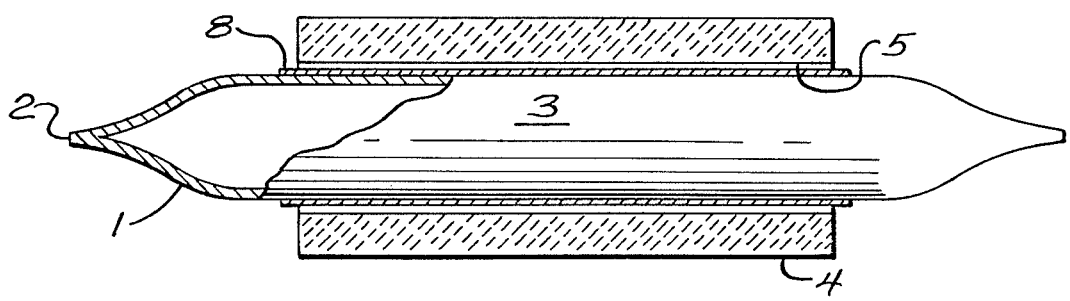
FIG. 5 is a side profile view of another embodiment of the invention illustrating a metallic tube having a material placed about its outer surface and positioned concentrically within a ceramic outer cylinder prior to bonding the metallic tube to the ceramic cylinder.

Another embodiment of the present inventive method of concentrically joining ceramic-to-metal cylinders is illustrated with reference to FIG. 5. In this process, the need to pre-metallize the inner surface 5 of a solid ceramic tube 4 is eliminated. Instead, a layer of active metal alloy, for example a pre-formed cylinder of active metal alloy foil, is placed between the outer surface of the inner copper tube 1 and the inner surface of the outer ceramic cylinder 4. An active metal alloy which contains titanium, zirconium, or other material which is capable of wetting the inner ceramic bore and forming a bond between the inner metal cylinder 1 and outer ceramic cylinder 4, has been found to be satisfactory. That is, the resulting bond between the metal and ceramic cylinders was found to be sufficiently strong to survive the subsequent machining process steps involved in forming the concentrically joined cylinders into a composite helical structure. Such a metallizing process is described in the W. H. Kohl text, op cit, p. 451 ff and in F. C. Kelly, "METALLIZING AND BONDING NON-METALLIC BODIES", U.S. Pat. No. 2,570,248 previously discussed. The tubes thus prepared for brazing are then processed in the manner previously disclosed to form the joined concentric cylinders.

Figure 8:
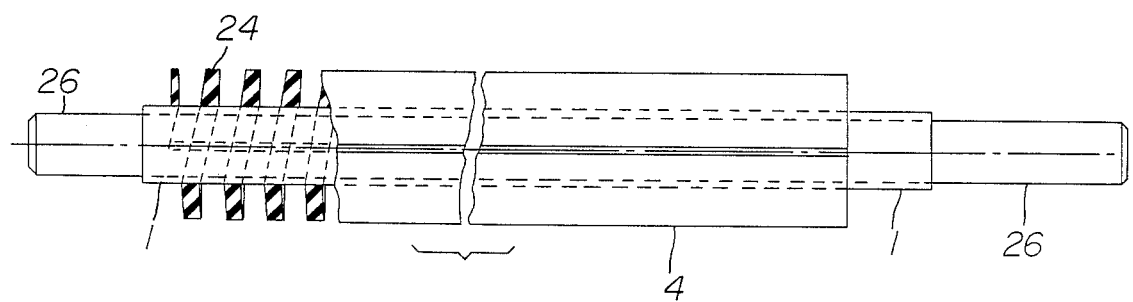
FIG. 8 is a side view showing in partial cross section a metal tube bonded to a ceramic cylinder as the ceramic cylinder is machined into a helix.

After the copper tube 1 has been brazed to the ceramic cylinder 4 by any one of the inventive bonding processes discussed above, the concentrically joined structure is machined into a configuration suitable for TWT applications. Thus when the concentric cylinders 10 have cooled, the ends 2 of the copper tube 1 are severed and the water removed from the interior. As illustrated in FIG. 8 the concentrically joined cylinders 10 are then preferably mounted on a mandrel 26 to provide support and control over the cylinders 10 during subsequent machining.

In the presently preferred embodiments of the present inventive process the copper tube 1 and ceramic cylinder 4 are separately machined into helical structures. This permits a resultant configuration in which the ceramic is "undercut" on the copper helix and further allows the use of differing machining processes which are most useful in working the particular materials. Thus as generally illustrated in FIG. 3 the ceramic cylinder 4 is first machined by an appropriate process such as grinding with an abrasive such as diamond. Thereafter the copper cylinder 1 is machined into a helical shape. Since the high conductivity type of copper that is preferably used to form the helix typically has a great degree of ductility, electrical machining by a process such as electric discharge machining (E.D.M.) has been found to more conveniently form the copper tube 1 into a helical configuration than conventional grinding processes.

After this final machining of the copper tube 1 the concentrically joined cylinders 10 suitably form a self-supporting composite helical structure as shown in FIGS. 6 and 7 having high thermal conductivity and relatively low RF attenuation with dielectric loading characteristics improved over conventionally fabricated composite helix structures.

While the invention has been described in the specification and illustrated in the drawings with reference to preferred embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments illustrated by the drawings and described in the specification as the best mode presently contemplated for carrying out this invention, but that the invention will include all the embodiments falling within the scope of the appended claims.

We claim:

1. A method of making a metal-lined ceramic structure from a ceramic cylindrical member having a relatively small inner diameter thereof on the order of 0.100 inches and a ductile metal cylinder having a relatively small outer diameter thereof on the order of but slightly less than the inner diameter of the ceramic cylindrical member, comprising:

applying a thin moly-maganese metallic coating to the inner surface of the ceramic cylinder bore, overcoating said moly-maganese metallic coating with a thin nickel plating, applying a thin coating of silver to the outer cylindrical surface of said metal cylinder, inserting the silver coated metal cylinder within the metallic coated bore of said ceramic cylinder, forming an airtight seal at one end of the silver coated metal cylinder, placing a predetermined quantity of liquid water within the metal cylinder, forming an airtight seal at the other end of the silver coated metal cylinder wherein the predetermined quantity of liquid water is contained within the sealed metal cylinder, heating the sealed metal cylinder and the surrounding ceramic cylinder to a temperature of at least 850 degrees centigrade in a hydrogen atmosphere and vaporizing said liquid water contained in said sealed ductile metal cylinder to expand said ductile material into intimate contact with the inner bore of said ceramic cylinder and producing a molten state of the metallic coating, silver and nickel and to braze the inner metal cylinder to the surrounding ceramic cylinder, cooling the brazed cylinders to room temperature and returning said vaporized water to a liquid at atmospheric pressure, severing the sealed ends from the metal cylinder extending beyond the ends of the ceramic cylinder, and removing said liquid water from said metal cylinder.

2. A method of forming a composite metal-ceramic helix from a ceramic member having a relatively small inner diameter on the order of 0.100 inches and a ductile metal cylinder having a relatively small outer diameter on the order of but slightly less than the inner diameter of the ceramic cylinder member, comprising:

applying to an inner surface of the ceramic cylinder bore a first metallic coating facilitating the joining of the ceramic cylinder to the ductile metal cylinder, applying to an outer cylindrical surface of said metal cylinder a second metallic coating facilitating the joining of the metal cylinder to the ceramic cylinder, inserting the metallic coated metal cylinder within the metallic coated bore of said ceramic cylinder, forming an airtight seal at a first end of the metallic coated metal cylinder, placing a predetermined quantity of liquid water within the metal cylinder, forming an airtight seal at a second end of the metallic coated metal cylinder wherein the predetermined quantity of liquid water is contained within the sealed metal cylinder, heating in a hydrogen atmosphere the sealed metal cylinder and the surrounding ceramic cylinder to a temperature facilitating brazing between the metal cylinder and the ceramic cylinder and vaporizing said liquid water contained in said sealed ductile metal cylinder to expand said ductile metal into intimate contact with the inner surface of said ceramic cylinder, and producing a molten state in the first and second metallic coatings and brazing the outer surface of the inner metal cylinder to the inner surface of the outer ceramic cylinder, cooling the brazed metal and ceramic cylinders to room temperature and returning said vaporized water to a liquid state at atmospheric pressure, severing from the brazed metal and ceramic cylinders the first and second sealed ends of the metal cylinder extending beyond the ends of the ceramic cylinder, removing said liquid water from said metal cylinder, and machining the brazed and concentrically joined metal and ceramic cylinders into a helical configuration.

3. The method of claim 2 wherein the method step of machining the concentrically joined cylinders into a helical configuration further comprises:
   machining the ceramic cylinder alone into a helical configuration, and
   machining exposed portions of the metal cylinder into a helical configuration.

4. The method of claim 3 wherein the ceramic cylinder is machined into a helical configuration by abrasive grinding and wherein the metal cylinder is machined into a helical configuration by electric discharge machining.

5. The method of claim 2 wherein an airtight seal at the first and second ends of the metal cylinder are formed by collapsing the first and second ends of the metal cylinder and then brazing the collapsed first and second ends to form high pressure resistant seal.

6. The method of claim 2 wherein the metal cylinder is approximately two inches long and wherein approximately four microliters of water are sealed within the metal cylinder.

7. The method of claim 2 wherein said ceramic cylinder is made of beryllium oxide and wherein the step of applying a first metallic coating to the inner surface of the ceramic cylinder further comprises
   applying a thin moly-manganese coating, and overcoating said moly-manganese coating with a thin nickel plating.

8. The method of claim 2 wherein said metal cylinder is made of copper and wherein the step of applying a second metallic coating to the outer cylindrical surface of said metal cylinder includes applying a thin coating of silver to the metal cylinder outer cylindrical surface.

9. A method of forming a composite metal-ceramic helix from a pair of ceramic members having a configuration which, when assembled, forms a cylindrical structure having a relatively small inner diameter on the order of 0.100 inches, and a ductile metal cylinder having a relatively small outer diameter on the order of but slightly less than the inner diameter of the assembled ceramic members, comprising:
   applying to a first surface of each of the ceramic members a first metallic coating facilitating the joining of the ceramic members to the ductile metal cylinder,
   assembling the ceramic members so as to form a cylindrical structure and restraining the ceramic members so as to retain said assembled configuration,
   inserting the metal cylinder within a bore formed in the assembled ceramic members,
   forming an airtight seal at a first end of the metal cylinder,
   placing a predetermined quantity of liquid water within the metal cylinders,
   forming an airtight seal at a second end of the metal cylinder wherein the predetermined quantity of liquid water is contained within the sealed metal cylinder,
   heating in a hydrogen atmosphere the sealed metal cylinder and the surrounding assembled ceramic members to a temperature facilitating brazing between the metal cylinder and the ceramic members and vaporizing said liquid water contained in said sealed ductile metal cylinder to expand said ductile metal into intimate contact with the inner surface of said ceramic members, producing a molten state in the first metallic coating and brazing the outer surface of the inner metal cylinder to the inner surface of the assembled ceramic members wherein the metal cylinder and ceramic members form a concentrically joined structure,
   cooling the brazed metal cylinder and ceramic members to room temperature and returning said vaporized water to a liquid state at atmospheric pressure,
   severing from the brazed metal cylinder and ceramic members the first and second sealed ends of the metal cylinder extending beyond the ends of the ceramic members,
   removing said liquid water from said metal cylinder, and
   machining the brazed and concentrically joined metal cylinder and ceramic members into a helical configuration.

10. The method of claim 9 wherein the method step of machining the concentrically joined metal cylinder and ceramic members into a helical configuration further comprises:
   machining the ceramic members alone into a helical configuration, and
   machining exposed portions of the metal cylinder into helical configuration.

11. The method of claim 10 wherein the ceramic members are machined into a helical configuration by abrasive grinding and wherein the metal cylinder is machined into a helical configuration by electric discharge machining.

12. The method of claim 9 wherein the airtight seal at the first and second ends of the metal cylinder are formed by collapsing the first and second ends of the metal cylinder and then brazing the collapsed first and second ends to form a high pressure resistant seal.

13. The method of claim 9 wherein the metal cylinder is approximately two inches long and wherein approximately four microliters of water are sealed within the metal cylinder.

14. The method of claim 9 wherein the ceramic members are made of beryllium oxide and wherein the first metallic coating applied to the first surface of each of the ceramic members includes successive layers of Ti, Mo and Cu.

15. The method of claim 9 wherein said metal cylinder is made of copper and further comprising the step of silver plating an outer cylindrical surface of said metal cylinder.

* * * * *